(12) United States Patent
Kumar et al.

(10) Patent No.: US 8,570,342 B2
(45) Date of Patent: Oct. 29, 2013

(54) PROCESS OF INHERITING COLORS IN A CUSTOMER RELATIONSHIP MANAGEMENT (CRM) APPLICATION FROM OPERATING SYSTEM COLORS

(75) Inventors: Sharath K. Kumar, Karnataka (IN); Aneesh Bhatnagar, Karnataka (IN)

(73) Assignee: Talisma Corporation Private Ltd. (IN)

( * ) Notice: Subject to any disclaimer, the term of this patent is extended or adjusted under 35 U.S.C. 154(b) by 73 days.

(21) Appl. No.: 13/002,471

(22) PCT Filed: May 19, 2009

(86) PCT No.: PCT/IB2009/052077
§ 371 (c)(1),
(2), (4) Date: Mar. 30, 2011

(87) PCT Pub. No.: WO2010/001278
PCT Pub. Date: Jan. 7, 2010

(65) Prior Publication Data
US 2011/0187737 A1 Aug. 4, 2011

(30) Foreign Application Priority Data
Jul. 1, 2008 (IN) .......................... 1599/CHE/2008

(51) Int. Cl.
*G09G 5/02* (2006.01)

(52) U.S. Cl.
USPC ............ 345/604; 345/589; 345/600; 715/810

(58) Field of Classification Search
None
See application file for complete search history.

(56) References Cited

U.S. PATENT DOCUMENTS

| | | | | |
|---|---|---|---|---|
| 6,795,084 | B2 * | 9/2004 | Newman | 345/589 |
| 7,388,590 | B2 * | 6/2008 | O'Neil et al. | 345/589 |
| 7,928,991 | B2 * | 4/2011 | Moran et al. | 345/591 |
| 2002/0095663 | A1 * | 7/2002 | Joory | 717/136 |

* cited by examiner

*Primary Examiner* — Antonio A Caschera
(74) *Attorney, Agent, or Firm* — Steven M. Greenberg, Esq.; Carey Rodriguez Greenberg O'Keefe LLP

(57) ABSTRACT

A method to adjust the colors of skin of a graphical user interface (GUI) of a customer relationship management (CRM) application based upon a color scheme of an operating system is provided. In the method, a color code of the color scheme of an operating system is fetched from a registry entry of the operating system and is saved as a base color. This color code is converted from ARGB format to RGB format and further converted from RGB format to HSL format. Different luminance values are set for various elements of the CRM application to provide different brightness and legibility to different elements of the GUI. The modified color code is converted back to RGB format and assigned to various pixels of GUI skin whereby the CRM application is rendered with new color scheme similar to that of the operating system.

7 Claims, 2 Drawing Sheets

PROCESS OF INHERITING COLORS IN A CUSTOMER RELATIONSHIP MANAGEMENT (CRM) APPLICATION FROM OPERATING SYSTEM COLORS

CROSS-REFERENCE TO RELATED APPLICATIONS

This application is a §371 national stage entry of International Application No. PCT/IB2009/052077, filed May 19, 2009, which claims priority to Indian Patent Application No. 1599/CHE/2008, filed Jul. 1, 2008.

TECHNICAL FIELD

Technical Field

The invention relates to a method to adjust the colors of the Graphic User Interface (GUI) skins in a CRM application to match the color scheme of any operating system currently in use. In particular, the invention relates to a method to render the GUI skin color of a CRM application with a color similar to the color scheme of the operating system and make it visually appealing while maintaining legibility of visual features of the application.

BACKGROUND ART

Background Art

Customer Relationship Management (CRM) is a term applied to processes implemented by a company to handle its interaction with its customers. CRM software is used to support these processes, storing information on current and prospective customers. Information in the system can be accessed and entered by employees in different departments, such as sales, marketing, customer service, training, professional development, performance management, human resource development, compensation and others. Details on any customer contacts can also be stored in the system. The rationale behind this approach is to improve services provided directly to customers and to use the information in the system for targeted marketing and sales. CRM software reduces operating costs and helps all customer-facing personnel of the company make better and timely decisions. Companies or organizations in almost every industry try to use customer information to manage relationships.

DISCLOSURE OF INVENTION

Technical Problem

The CRM application runs on a computer system with an operating system. Some latest operating systems provide some predefined color schemes that a user can select and set as default. Each color scheme specifies a color (each color being a particular combination of Red, Green and Blue values). When the CRM application is run on an operating system with a particular color scheme, the user expects the same color scheme to be reflected on the GUI elements of the application for a better visual experience. A GUI is a type of graphical user interface which allows people to interact with electronic devices like computers, hand-held devices, household appliances and office equipment, etc. Examples of GUI elements include windows, dialogs, buttons, checkboxes, drop downs, menus, toolbars, scroll bars, and any other feature of a program that is intended to allow the user to perform some action. In a CRM application, every color scheme may specify a color for the menu bar, a color for text included in the text area, a color used to highlight a selected item, etc. All the colors have the same base color but have a different brightness for the same base color. This combination comprises the color scheme used for the application.

At present, there is no CRM application whose GUI can inherit or adopt the color scheme of the operating system and whose GUI skin is adaptable to the color scheme of the operating system. The result is conflicting color contrasts in the computing environment. For example, if the color scheme set by the user in the operating system is pink, the whole environment of the GUI of the operating system changes its color to pink and when a CRM application is run on such an environment its GUI remains the same as set in the CRM application's default setting, for example, blue. This results in conflicting color schemes between the background and the CRM application's GUI skin color. In order to enhance user experience while viewing or using an application, the user interface should adapt its GUI skin color to the one used in the operating system. Accordingly, what is needed is a method that can render GUI skins of a CRM application with a color similar to the color scheme of the operating system while maintaining legibility of visual features of the application's GUI.

Technical Solution

The invention meets the above needs and overcomes one or more deficiencies in the existing technologies by providing a method that can render the GUI skin color of the CRM application with a color scheme similar to the color scheme of the operating system and makes it visually appealing while maintaining legibility of the visual features of the application. Moreover, every time a user changes the color scheme of the operating system, the CRM application's Win32 GUI dynamically inherits the color and generates the interface in the inherited color, giving it skin adaptability.

The invention uses the color code values stored inside the registry entry of the operating system to provide skin color to the CRM application's Win32 GUI. Color code is fetched from the registry entry of the operating system and converted from Alpha, Red, Green, and Blue (ARGB) color format to Red, Green, and Blue (RGB) color format. This color format is further converted into Hue, Saturation, and Luminance (HSL) color format. This conversion achieves light and dark colors for the same base color, which are then used in various controls of the operating system to generate the skin for the GUI. Moreover, every time a user changes the color option of the operating system, the CRM application's GUI dynamically inherits the color and generates the interface in the inherited color thus giving it dynamic skin adaptability.

In accordance with one aspect of the invention, a method is provided to adjust the GUI skin color of the CRM application to match the color scheme of the operating system. The method includes fetching color code stored in ARGB format from the registry key of the operating system, converting ARGB color format of the color code to the first color format, storing values of the first color format as base color, converting the first color format to the second color format, setting pre-determined Luminance values to the Luminance component of the second color format, converting second color format to the first color format, assigning values of the first color format to plurality of pixels of the GUI skin of the CRM application whereby providing different brightness and legibility to different elements of GUI. The first color format is RGB format and the second color format is HSL color format.

In accordance with another aspect of the invention, the method to dynamically render GUI skin colors of CRM application having first color scheme, to a second color scheme of the operating system upon detecting a change in the first color scheme in the operating system includes detecting change in color scheme from first color scheme to second color scheme, adapting second color scheme of the operating system, applying the adapted second color scheme to the CRM application GUI, displaying CRM application GUI in second color scheme.

Advantageous Effects

One of the advantages of the invented method is that a user working on a computing device with a particular color scheme in the operating system can work with the same color scheme on the CRM application. The user does not have to struggle with the screens that look startlingly different in terms of their color schemes. Hence, the invention makes the application a visually appealing CRM application running on an operating system with various color schemes, as it anticipates and considers the visual requirements of the user. Moreover, the invention controls the brightness of various elements of the application while maintaining the same base color for the whole of the application, to make various elements the GUI legible and pleasing when displayed together. Another advantage of the method is that if the CRM user subsequently switches to a different color scheme, the CRM application automatically adapts the color scheme matching with the new color scheme of the operating system.

The above explanation is provided to introduce a selection of concepts in a simplified manner that are further described below in detail, and in no way restricts the scope of the disclosed invention. The steps described in different aspects of the invention can be performed in different orders. Furthermore, the steps may also be combined, for example two or more step are performed together. The above, as well as the additional purposes, features and advantages of the present invention will become apparent in the following written description.

DESCRIPTION OF DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings. Example embodiments are illustrated by way of example and not limitation in the figures of the accompanying drawings, in which like references indicate similar elements and in which:

BEST MODE

Figure 1:
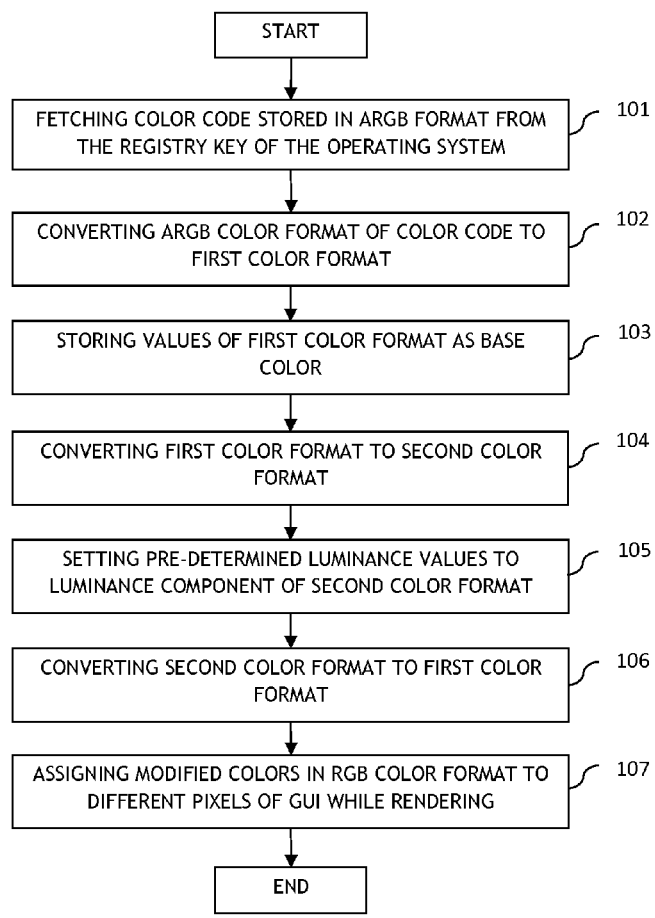
FIG. 1 is a process flow illustrating the steps typically performed by the method to adjust GUI skin colors of the CRM application similar to the operating system's color scheme, in accordance with one embodiment of the present invention.

In order to address and overcome the above mentioned problems and limitations in the prior art, embodiments of the present invention provide a method of adjusting GUI skins color of the CRM application, similar to color scheme of the operating system. While the invention has been particularly shown and described with reference to an illustrative embodiment, it will be understood by those skilled in the art that various changes in the form and detail may be made therein without departing from the spirit and soul of the invention. The following description is directed to techniques for adjusting GUI skin color of a CRM application, similar to operating system's color scheme. Also, the description may be directed to a user interface for which color brightness of various elements of GUI are predetermined.

The present description of exemplary embodiments includes references to the terms 'Graphic User Interface', 'Operating System', 'CRM user' or 'Application'. The following definitions of these terms are provided only as example settings to which embodiments, as described herein, may be applied. That is, these definitions are in no way intended to be limiting of the example embodiments described herein. As set forth above, a 'Graphic User Interface' (GUI) may include on-screen features of a computing device including, but not limited to windows, dialog boxes, buttons, checkboxes, drop down menus, action menus, toolbars, scroll bars, and any other feature of a program that is intended to allow the user to perform some action. Thus, a GUI may define how a user interacts with applications using a display corresponding to a particular computing device. An 'Application' may refer to an executable file that is run on a local computing device or an executable device that is run on one or more remote computing devices but has a visual component thereof displayed locally, via a network. With reference to invented method an application may be a CRM application running on a computing device. The term 'CRM user' may include any individual using the CRM application on a computing device. The term computing device may include any one of a desktop computer, a laptop computer, a PDA (Personal digital assistant) or any other handheld device running a CRM application.

In the exemplary embodiment, a method is provided to adjust the GUI skin color of the CRM application to match the operating system's color scheme. The method includes fetching color code stored in ARGB format from the registry key of the operating system (Step 101, FIG. 1), converting ARGB color format of the color code to the first color format (Step 102, FIG. 1), storing values of the first color format as base color (Step 103, FIG. 1), converting the first color format to the second color format (Step 104, FIG. 1), setting pre-determined Luminance values to the Luminance component of the second color format (Step 105, FIG. 1), converting second color format to the first color format (Step 106, FIG. 1), assigning values of the first color format to plurality of pixels of the GUI skin of the CRM application (Step 107, FIG. 1) whereby providing different brightness and legibility to different elements of GUI. The first color format is RGB format and the second color format is HSL color format.

Figure 2:
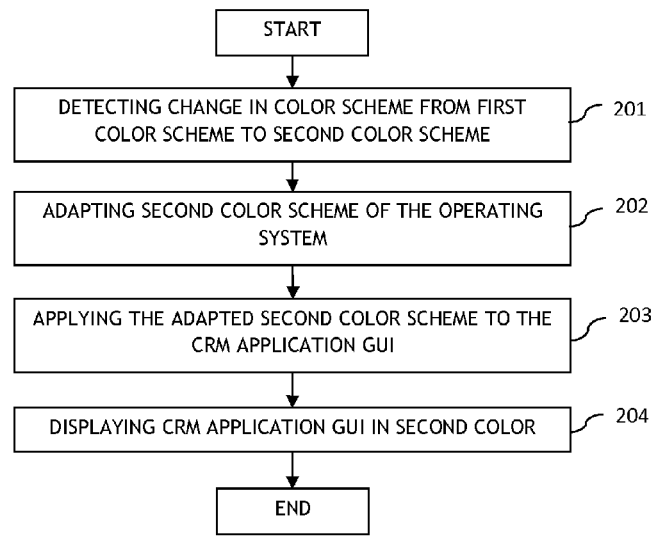
FIG. 2 shows a process flow illustrating the steps typically performed by the method to dynamically render GUI skin colors of CRM application having first color scheme, to a second color scheme of the operating system, upon detecting a change in first color scheme in the operating system, in accordance with another embodiment of the invention.

In accordance with another exemplary embodiment, the method to dynamically render GUI skin colors of CRM application having first color scheme, to a second color scheme of the operating system, upon detecting a change in first color scheme in the operating system includes detecting change in color scheme from first color scheme to second color scheme application (Step 201, FIG. 2), adapting second color scheme of the operating system (Step 202, FIG. 2), applying the adapted second color scheme to the CRM application GUI (Step 203, FIG. 2), displaying CRM application GUI in second color scheme (Step 204, FIG. 2).

Referring now to the drawings wherein the figures are made for the purpose of illustrating preferred embodiments of the present invention only and not for limiting the same.

Figure 3:
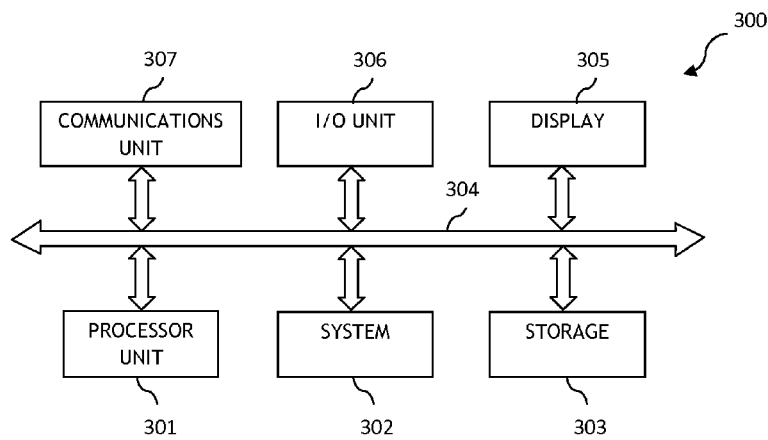
FIG. 3 is a block diagram illustrating one example of a suitable computing environment or operating environment on operating system's color scheme in which the disclosed method may be implemented.

FIG. 1 shows a process flow illustrating the steps typically performed by the method to adjust GUI skin colors of a CRM application, similar to the operating system's color scheme, in accordance with one aspect of the invention. The CRM application, in which the disclosed method is implemented, is run on a general computing device 300 (FIG. 3). Upon initialization of the CRM application, in order to extract the color currently selected by the CRM user as color scheme of the operating system, the method fetches the color code stored in ARGB format from the registry key 'Colorization-Color' inside the operating system at step 101 (FIG. 1). It is well known that the 'ColorizationColor' registry key inside the operating systems, generally resides under the registry key path 'HKEY_CURRENT_USER\\SOFTWARB \\ Microsoft\\Windows \\DWM' . The color code inside the registry key of the operating system is stored in ARGB format. ARGB stands for Alpha, Red, Green and Blue wherein each of these color components has a separate value between 0 and 255. The Alpha component determines the transparency. At step 102, the color code obtained at step 101 is converted to first color format which is RGB color format. It is to be noted that the ARGB to RGB, RGB to HSL and HSL to RGB conversion techniques used in the invented method are quite well known algorithms in the art that can be found in numerous places on the web and thus a detailed explanation is not provided for such conversions. At step 103, first color format i.e. the RGB color format of the color code is stored as a base color.

Most modern computer displays use 16, 24 or 32 bits per screen pixel. The number of bits per screen pixel determines the display's screen bit depth that determines the screen color resolution, which depicts how many distinct colors the display screen can produce. Most of the computer display systems use either an indexed or a true color scheme for displaying color at each pixel of the screen. In Indexed color scheme, a color is specified using an index into a hardware color lookup table (or palette). Each entry of the color lookup table corresponds to an individual color and consists of a red value, green value and a blue value. Whereas in true color scheme a color is specified using an RGB triple i.e. Red, Green, Blue. It is the specification of the color of a pixel on a display screen using a 24-bit value, which allows the possibility of up to 16,777,216 possible colors. Some new color display systems these days offer a 32-bit color mode, allowing up to 4,294,967,296 possible colors. The extra byte, called the alpha channel, is used for control and special effects information. Controlling this huge amount of color possibilities is almost impossible in RGB mode. Thus at step 104, the first color format i.e. the RGB color format is further converted to corresponding values in second color format i.e. the HSL color format that provides an intuitive method for color selection. In HSL (Hue, Saturation and Luminance) format, each color is described by its Hue, Saturation, and Luminance. Hue specifies the color of a pixel, while Saturation determines the shade of that color whereas Luminance is the amount of brightness given off by a pixel or area on a display surface. A very bright color has a high Luminance value, while a dim color has a low Luminance value. After converting color code from RGB format to HSL format, the next step 105 is followed in which the invented method sets a predetermined Luminance value to the various pixels elements of the application GUI, such as title bar, menu bar, dialog box, selected item, work area etc. Various parts of the GUI need different brightness levels in order to easily differentiate one part from another. As an example, it might be desirable to keep two alternate colors (i.e. light and dark shades for the same base color) for information data or text appearing one after another on the screen or keep a light or dark shade of the same base color for the dialog box or bright shade for the item selected by the user while using the CRM application. The Luminance value is adjusted in such a way so as to keep its minimum and values within a range from 0 to 240 while maintaining the legibility of the various elements of the GUI. A method may be defined that may accept the Luminance value and give back the desired shade of the base color. In the next step 106, the second color format i.e. the HSL color format is again converted back to corresponding values in first color format i.e. the RGB color format. At step 107, these modified colors in RGB format are assigned to various pixels of the GUI, in the CRM application, while rendering. After step 107, these steps conclude.

FIG. 2 shows a process flow illustrating the steps typically performed by the method to dynamically render GUI skin colors of CRM application having first color scheme, to a second color scheme of the operating system, upon detecting a change in first color scheme in the operating system, in accordance with another embodiment of the invention. Upon changing the color scheme of the operating system from first color scheme to the second color scheme, the process initiates at step 201, by detecting any changes in the color scheme. At step 202, the second color scheme is adapted by the CRM application. In the next step 203, the adapted second color scheme is applied automatically to the GUI of the CRM application window currently in use. At step 204, the CRM application window is displayed in the new color scheme. After step 204, these steps conclude. Thus, every time a CRM user changes the color scheme of the operating system, CRM application's GUI dynamically inherits the color and renders the pixels of the GUI interface in the inherited color.

Those skilled in the art will appreciate that the steps shown in the flow diagrams in FIG. 1 and FIG. 2 may be altered in a variety of ways. For example, the order of steps may be altered; sub steps may be performed in parallel; shown steps may be deleted or some new steps may be included as per the requirement of the system on which it is implemented.

It will be quite evident to a person skilled in the art that the base color is fetched from the 'COLOR_ACTIVECAPTION' found in 'Windows.h' instead and the remaining steps will remain the same as described above with respect to FIG. 1 and FIG. 2. The system color indexes are defined using the predefined constants found in the WINDOWS.H file.

FIG. 3 is a block diagram illustrating an example of suitable computing system environment in which the invented method may be implemented. The computing system environment is only one example of a suitable computing environment and is not intended to suggest any limitation as to the scope of use or functionality of the invention. Neither should the computing system environment be interpreted as having any dependency or requirement relating to any one nor a combination of components illustrated in the exemplary operating environment.

Computer Environment includes a general-purpose computing device in the form of a computer 300, which may be any of computing devices. While the present invention is described hereinafter with particular reference to the system block diagram of FIG. 3 it is to be understood at the outset of the description which follows, it is contemplated that the apparatus and methods in accordance with the present invention may be used with other hardware configurations as well. For example, the system processor could be an Intel Pentium IV at the Server side and Pentium III at the Client's side. The exemplary CRM application is operational with numerous other general purpose or special purpose computing system environments or configurations. Examples of well known computing systems, environments, and/or configurations that may be suitable for implementation or use include, but are not limited to personal computer, desktop or a server computer, laptops which run on any one of the following operating system Windows Server 2003, Windows XP, Windows Vista. For accessing the CRM application over the web, internet browsers such as Internet Explorer and Firefox are supported.

Turning now to FIG. 3, a diagram of a design system is depicted in accordance with an illustrative embodiment. In this illustrative example, Data Processing System 300 includes Communications Fabric 304, provides communications between Processor Unit 301, System Memory 302, Storage Media 303, Communications Unit 307, I/O unit 306, and Display 305. Processor Unit 301 serves to execute instructions for software that may be loaded into System Memory 302. Processor unit 301 may be a set of one or more processors or may be a multi-processor core, depending on the particular implementation. The Processing Unit 301 sends various data values, instructions, and information to all the devices and components inside Data Processing System 300 as well as the different peripherals and devices attached. The System Memory 302 is the place where the computer holds current programs and data that are in use. The System Memory 302 can be divided into two essential types: RAM and ROM. RAM, or Random Access Memory is 'volatile' which means that it only holds data while power is present. RAM changes constantly as the system operate, providing the storage for all data required by the operating system and software. ROM or Read Only Memory is always found on motherboards, but is increasingly found on graphics cards and some other expansion cards and peripherals. Instructions for the operating system, the object-oriented programming system, and applications or programs are located on Storage Media 303. These instructions may be loaded into System Memory 302 for execution by Processor Unit 301. The processes of the different embodiments may be performed by Processor Unit 301 using computer implemented instructions, which may be located in the System Memory 302.

Similarly in network environment, program modules depicted relative to Data Processing System 300, or portions thereof, may be stored in a Remote Memory Storage Devices. Various modules and techniques may be described herein in the general context of computer-executable instructions, such as program modules, executed by one or more computers or other devices. An implementation of these modules and techniques may be stored on or transmitted across some form of computer readable media. Storage Media 303 may include removable/non-removable, volatile/non-volatile computer storage media depending upon the particular implementation. For example, Storage Media 303 may be, a hard drive for reading from and writing to a non-removable, non-volatile magnetic media (not shown), magnetic disk drive for reading from and writing to removable, non-volatile magnetic disk (e.g. 'floppy disk') and optical disk drive for reading from and/or writing to a removable, non-volatile optical disk drive such as CD-ROM, DVD-ROM, a flash memory, or some combination of the above. The hard disk drive, magnetic disk drive and optical disk drive are each connected to the system bus through one or more data media interface.

Communications Unit 307, in these examples, provides for communications with other data processing systems or devices. In these examples, Communications Unit 307 is a network interface card. I/O Unit 306 allows for input and output of data with other devices that may be connected to Data Processing System 300. For example, I/O Unit 306 may provide a connection for user input though a keyboard and mouse. Further, I/O Unit 306 may send output to a printer. Display 305 provides a mechanism to display information to a user. Data Processing System 300 can be connected to other remote computing devices via network connections constituting a computer network. Remote computing device for example can be a desktop or a server computer, laptops. Remote computing device may include many or all of the elements and features described herein relative to Data Processing System 300. Alternatively, Data Processing System 300 can operate in a non-networked environment as well. Networks connections between the Data Processing System 300 and remote computers may be a local area network (LAN) and a wide area network (WAN). A LAN covers a small geographic area, like a home, office, or building whereas a WAN covers a relatively broad geographic area (i.e. one city to another and one country to another country). In a LAN environment, Data Processing System 300 is connected to local network of computers via network adapter. When implemented in a WAN network environment, Data Processing System 300 includes modem or other means for establishing communications over network. Modem can be internal or external to computer; can be connected to system bus via I/O Unit 306 or other appropriate mechanisms. In some illustrative examples, the Data Processing System 300 may be a Personal Digital Assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main System Memory 302 or cache memory. A Processing Unit may include one or more processors or CPUs. The depicted examples in FIG. 3 and above-described examples are not meant to imply architectural limitations. For example, Data Processing System 300 also may be a tablet computer, laptop computer, or telephone device in addition to taking the form of a PDA. In operation, Data Processing System 300 executes computer executable instructions such as those illustrated in FIG. 1 and FIG. 2. The order of execution or performance of the methods illustrated and described herein is not essential, unless otherwise specified. That is, elements of the methods may be performed in any order and that the methods may include more or less elements than those disclosed herein. FIG. 3 is intended as an example, and not as an architectural limitation for different embodiments. The hardware in FIG. 3 may vary depending on the implementation. In addition, the processes of the illustrative embodiments may be applied to a multi-processor data processing system.

In operation, Data Processing System 300 executes computer executable instructions such as those illustrated in FIG. 1 and FIG. 2. The order of execution or performance of the methods illustrated and described herein is not essential, unless otherwise specified. That is, elements of the methods may be performed in any order and that the methods may include more or less elements than those disclosed herein.

Reference has been made throughout this specification to 'one embodiment,' 'an embodiment,' or 'an exemplary embodiment' meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments. One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention. While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

Industrial Applicability

One of the main uses of the invented method is that a user working on a computing device with a particular color scheme in the operating system, can work with the same color scheme on the CRM application as well and enhance the user experience while working. The invention makes the application a visually appealing CRM application as it anticipates and considers the visual requirements of the user. Another advantage of the invented method is that if the CRM user subsequently switches to a different color scheme, the CRM application automatically adapts the color scheme matching with the new color scheme of the operating system. The new color scheme in the application GUI is immediately reflected on the application GUI. Moreover, the invention controls the brightness for various elements of the application while maintaining the same base color for the whole of the application in order to make various elements the GUI legible and pleasing when displayed together. The invented method can be implemented on any software application with a Graphic User Interface and particularly on a CRM application as shown in the detailed description above.

The invention claimed is:

1. A method to adjust a graphical user interface (GUI) color scheme of a customer relationship management (CRM) application to be similar to a color scheme of a supporting operating system executing in memory of a computer, the method comprising the steps of:
    fetching from a registry key of the operating system a color code stored in an alpha red green blue (ARGB) color format;
    converting in the memory of the computer said ARGB color format of said color code to a first color format;
    storing values of said first color format as a base color;
    converting said first color format to a second color format;
    setting pre-determined luminance values of said second color format to a luminance component wherein said luminance values range from 0 to 240;
    converting said second color format back to said first color format; and,
    assigning values of said first color format to pixels of the GUI color scheme of said CRM application.

2. The method as in claim 1, wherein said operating system has a plurality of color schemes and provides an option to select at least one color scheme from the user interface.

3. The method as in claim 1, wherein said color code is ARGB, comprising alpha, red, green and blue color values.

4. The method as in claim 1, wherein said first color format is RGB, comprising red, green and blue color values.

5. The method as in claim 1, wherein said second color format is HSL comprising all of hue, saturation and luminance values.

6. The method as in claim 1, wherein hue and saturation values remain unchanged in said second color format in the step of setting predetermined luminance values.

7. The method as in claim 1, further comprising the steps of:
    a) detecting a change in color scheme of the supporting operating system from a first color scheme to a second color scheme;
    b) adapting the second color scheme of said operating system;
    c) applying the adapted second color scheme to the GUI of the CRM application; and,
    d) displaying the GUI of the CRM application in the second color scheme.

* * * * *